UNITED STATES PATENT OFFICE 2,415,389

ALKOXY END-BLOCKED SILOXANES AND METHOD OF MAKING SAME

Melvin J. Hunter, Herbert J. Fletcher, and Chester C. Currie, Midland, Mich., assignors to The Dow Chemical Company, Midland, Mich., a corporation of Michigan No Drawing. Application May 31, 1944,
Serial No. 538,208

16 Claims. (Cl. 260—462)

This invention concerns certain new organo-siloxanes and a method of making the same.

The organo-siloxanes provided by the invention have the general formula:

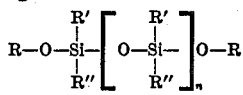

wherein R represents an alkyl radical, R' and R'' each represent a monovalent hydrocarbon radical and $n$ is an integer. The products are characterized by a molecular structure wherein a siloxane chain, having two organic radicals attached to each silicon atom, is terminated by alkoxy groups.

The alkoxy end-blocked siloxanes are liquid or solid products which are quite stable against decomposition by heat and which possess good dielectric properties. They also have the property, when applied to solid hydrophylic materials, of rendering the latter repellent to water. They may be hydrolyzed to remove the alkoxy radicals at the ends of the chain molecule with resultant formation of other organo-siloxane products. However, the alkoxy end-blocked siloxanes become more stable against hydrolysis with increase in the length of such siloxane chain molecules. Alkoxy end-blocked siloxanes having the above general formula wherein $n$ is of a value less than 50 are quite readily hydrolyzed and are adapted for use as chemical agents for the preparation of other organo-silicon compounds such as the corresponding cyclic siloxanes. The alkoxy end-blocked siloxanes having the above formula wherein $n$ is greater than 50, e. g., from 50 to 1000, are quite resistant to hydrolysis. These higher alkoxy end-blocked compounds, and siloxane mixtures consisting predominantly of such compounds, may be used, e. g. as dielectric agents, under conditions which involve contact with moisture. All of the alkoxy end-blocked siloxanes are useful as dielectric agents and as agents which may be applied to solid hydrophylic materials, such as cotton, glass, etc., to render them water repellent.

A given alkoxy end-blocked siloxane may be prepared by reacting an alcohol with either a corresponding alkoxy end-blocked siloxane of higher molecular weight or with an organo-siloxane which initially possesses no alkoxy groups in the molecule, e. g. by reacting the alcohol with a cyclic organo-siloxane or with an organo-siloxane having chain molecules which possess at their ends free hydroxyl groups. The alkoxy end-blocked siloxanes are preferably prepared by only partial hydrolysis of dialkoxy-silanes having the general formula:

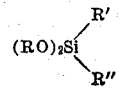

wherein R, R', and R'' have the meanings given above. Certain modifications of these general methods for preparing the products may also be employed.

During the treatment with water of a dialkoxy silane having the above general formula, at least two different reactions occur, viz., (1) hydrolysis of one or both alkoxy groups to form a corresponding hydroxylated silane and (2) intermolecular condensation of the latter to form a siloxane. Such reactions, carried out in the presence of an excess of water, are illustrated by the following equations:

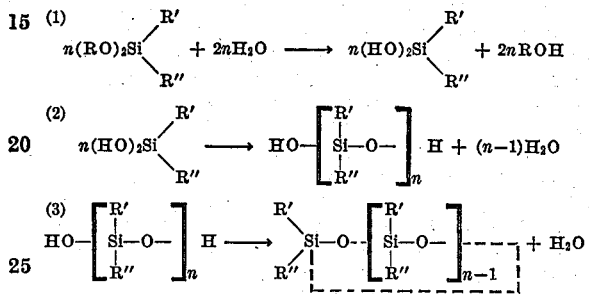

As will be seen from the equations just presented, for every two moles of water consumed in the hydrolysis reaction, one mole of water is regenerated in the condensation reactions which occur concurrently therewith. Theoretically, then, one molecular equivalent of water should suffice for the hydrolysis of a dialkoxy-silane and the condensation of the hydrolysis products to form siloxanes which are free of hydroxyl radicals. Actually, the initial presence of an excess of water, e. g. the presence of about 1.2 moles or more of water per mole of the dialkoxy-silane, is required in order to permit the hydrolysis to proceed substantially to completion.

The foregoing Equations 1 to 3 illustrate reactions which occur when a dialkoxy-silane is hydrolyzed with a molecular excess of water. We have found that by hydrolyzing a dialkoxy-silane with approximately a molecular equivalent or less of water, similar hydrolysis and condensation reactions occur concurrently, but in this instance to form an alkoxy end-blocked siloxane as the principal product. Such product is formed when carrying the reaction out with water in any amount within the limits just stated, but in order to hydrolyze all of the dialkoxy-silane starting material it is necessary that the latter be treated, prior to or during the reaction, with a total of at least 0.5 molecular equivalent of water. Accordingly, the hydrolysis of a dialkoxy-silane to form an alkoxy end-blocked siloxane is preferably carried out using as a starting material between 0.5 and 1.2 molecular equivalents of water per mole of the dialkoxy-silane.

We have also found that the average molecular weight of the alkoxy end-blocked siloxane prepared by such hydrolysis of a dialkoxy-silane varies with change (within the limits just stated) in the proportion of water used as a starting material. In general, the average molecular weight of the alkoxy end-blocked siloxane product becomes greater as the proportion of water is increased from 0.5 to 1.2 molecular equivalents per mole of the dialkoxy silane starting material.

It should be mentioned that when a dialkoxy silane is hydrolyzed with such limited amount of water, a number of alkoxy end-blocked siloxanes which differ only in molecular weight, i. e. in the number of —R′R″SiO— groups in the molecule, are formed simultaneously. The "average molecular weight" is, of course, the molecular weight determined for such mixture of alkoxy end-blocked siloxanes. We have observed that the relative proportions of the different alkoxy end-blocked siloxanes formed in a given reaction usually vary in accordance with the law of probabilities, i. e. the individual alkoxy end-blocked siloxane having an actual molecular weight most closely approximating the measured molecular weight of the mixture is usually present in greatest amount and the yields of the other siloxane products become less as the respective molecular weights become more remote from the average molecular weight for the mixture of such products. Accordingly, not only the average molecular weight of a mixture of alkoxy end-blocked siloxane products, but also the molecular weight of the principal individual product, may be predetermined by control of the amount of water used as a starting material.

Reactions which may occur simultaneously during the hydrolysis of a dialkoxy-silane with less than 1.2 molecular equivalents of added water are:

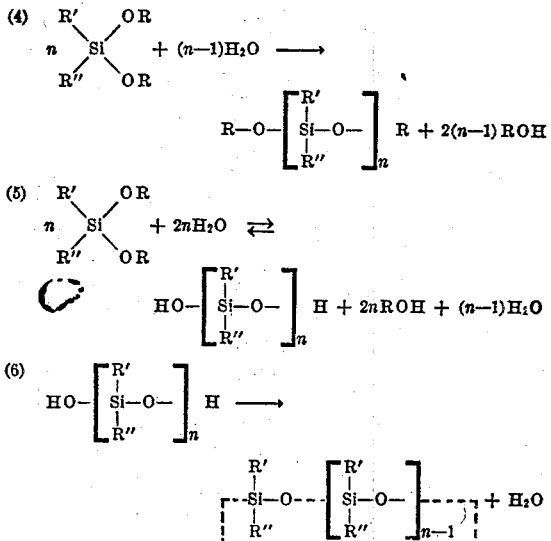

Equation 4 represents the reaction for formation of the desired alkoxy end-blocked siloxanes, whereas Equations 5 and 6 represent side reactions. The reaction of Equation 4, and probably also to some extent the reversible reaction of Equation 5, occur when hydrolyzing a dialkoxy-silane with 1.2 molecular equivalents or less of water. The occurrence of the reaction illustrated by Equation 6, and the extent to which such reaction takes place, is dependent to a large extent on the pH value of the reaction mixture.

The reactions for the hydrolysis of a dialkoxy-silane and for condensation of the hydrolysis products to form siloxanes may be catalyzed by the presence of a base, but such catalyst is not required in order to carry out the reactions. Accordingly, the reaction of a dialkoxy-silane with less than 1.2 molecular equivalents of water may be carried out under neutral or slightly alkaline conditions. Acids also catalyze the hydrolysis reaction, but favor the occurrence of the reaction illustrated by Equation 6. When operating under neutral or slightly alkaline conditions the undesired reaction of Equation 6, i. e. the reaction to form a cyclic siloxane, takes place to a relatively slight extent if at all. For these reasons, the reaction between a dialkoxy-silane and a limited amount of water to form an alkoxy end-blocked siloxane is carried out under neutral or slightly alkaline conditions. The reaction is advantageously carried out in the presence of a small amount of an alkali, e. g. sodium hydroxide, potassium hydroxide, sodium carbonate, potassium carbonate, or lime, etc., as a catalyst. However, the presence of any considerable amount of alkali is avoided, since an alkali, when used in considerable amount, tends to form salts of hydroxy-siloxanes (such as are formed in the reversible reaction of Equation 5) and thus curtails the yield of the desired alkoxy end-blocked siloxanes. In practice, not more than 0.1 and preferably between 0.002 and 0.02, gram equivalent weight of alkali is employed as a catalyst per gram atomic weight of silicon in the organosilicon compounds under treatment.

An alkali, if present in amount greater than the catalytic proportions just mentioned, may not only curtail the formation of an alkoxy end-blocked siloxane, but may also cause partial destruction of such product, or splitting of alcohol from the product with resultant further occurrence of condensation reactions and change in the molecular weight of the product. Since an alkali, if present, becomes concentrated in the residue during distillation of the alkoxy end-blocked siloxanes, it is important, in order to avoid partial loss of the product, that the alkali be removed prior to such distillation. We have found that this may be accomplished by treating the crude reaction mixture with carbon dioxide, to precipitate the alkali as a carbonate and filtering.

In preparing alkoxy end-blocked siloxanes from a dialkoxy-silane, the latter is treated with not more than 1.2, and preferably from 0.5 to 1.0, molecular equivalent of water. If desired, a minor amount of an alkali may be added as a catalyst. The reaction to form the alkoxy end-blocked product occurs slowly at room temperature and more rapidly at elevated temperatures. Usually the mixture is heated at temperatures of from 70° to 150° C. or higher so as to obtain quite rapid reaction. The reaction may be carried out at atmospheric, or superatmospheric pressure, or under vacuum, as desired. The reaction may advantageously be carried out under conditions of temperature and pressure such as to distill alcohol from the mixture as it is formed. However, the alcohol may, if desired, be permitted to remain during the reaction and thereafter be distilled from the product. An alcohol, if permitted to remain during the reaction, has the effect of suppressing somewhat the average molecular weight of alkoxy end-blocked siloxane products and it may also serve as a mutual solvent for the reactants. In some instances, an alcohol is initially added to the reaction mixture in order to obtain such results. However, during or after completion of the reaction, alcohol is distilled from the mixture. The alcohol thus recovered is of high concentration and constitutes a valuable by-product from the process.

The product formed by the reaction consists largely, if not entirely, of a mixture of alkoxy end-blocked siloxanes. As already mentioned, the average molecular weight of such mixture of products, and also the true molecular weight of the principal product, are dependent to a large extent on the proportion of water used in preparing the products. According to the aforementioned Equation 4, the relationship between the molecular ratio of water to a dialkoxy-silane used in preparing the products and the number of silicon atoms in a molecule of the principal alkoxy end-blocked product should be as outlined in the following table, wherein the terms "dialkoxy-silane" and "alkoxy end-blocked siloxane" are, for convenience, abbreviated as "D. S." and "A. E. B. S.", respectively.

TABLE I

| Mole ratio $H_2O$/D. S. | Si atoms in principal A. E. B. S. |
|---|---|
| 1/2 or less | 2 |
| 2/3 | 3 |
| 3/4 | 4 |
| 4/5 | 5 |
| 5/6 | 6 |
| 6/7 | 7 |
| 7/8 | 8 |
| 8/9 | 9 |
| 9/10 | 10 |

Experimental results usually, though not always, agree well with these theoretical values. Due to the fact that the reactions to form alkoxy end-blocked siloxanes tend to cease or become sluggish slightly short of completion of the reaction and that other reaction conditions besides the molecular ratio of water to the dialkoxy silane starting material, e. g. the presence or absence of alcohol as a medium for the reaction and the kind and amount of alkali present as a catalyst, may influence the molecular weight of the principal product, it will be understood that the above values do not always accord with measured values. They are presented for purpose of illustrating the way in which, under otherwise similar reaction conditions, the molecular weight of the principal product varies with change in the proportion of water employed in preparing the same, and not as exact values.

For some purposes, e. g. as dielectric agents, a mixture of alkoxy end-blocked siloxanes, produced as just described, may be employed directly. However, individual alkoxy end-blocked silanes may in some instances be preferred, in which case the products are separated, e. g. by fractional distillation. Prior to distilling the mixture, any alkali present is removed, by careful neutralization with an acid such as acetic, hydrochloric, or sulphuric acid, or by treatment with carbon dioxide to form the carbonate and removal of the latter by filtration. The fractional distillation to separate an individual alkoxy end-blocked siloxane is preferably carried out under vacuum, but it may sometimes be accomplished at atmospheric pressure or above.

In preparing alkoxy end-blocked siloxanes by the reaction of an alcohol with an organo-siloxane which initially is free of alkoxy radicals, the mixture of starting materials is treated with a minor amount of an alkali. The reaction to form the alkoxy end-blocked siloxanes occurs at room temperature or thereabout, but is usually carried out at temperatures of 60° C. or higher. Such reaction may be carried out at atmospheric pressure while refluxing the alcohol, but, in order to avoid loss of the latter, it is advantageously carried out in a bomb or autoclave at the autogenous pressure of the reaction mixture. During the reaction, a mixture of alkoxy end-blocked siloxanes of different molecular weights is produced. The average molecular weight of the products, and also the true molecular weight of the principal product, are dependent to a large extent on the proportion of alcohol reacted, relative to the silicon content of the material under treatment. In general, an increase in the proportion of alcohol reacted results in a decrease in the average molecular weight of the alkoxy end-blocked products. After completing the reaction, the alkoxy end-blocked products may be separated as hereinbefore described.

The two foregoing general methods for the production of alkoxy end-blocked siloxanes may be modified somewhat and be employed in conjunction with one another for the production, in good yield, of such product of a desired molecular weight. For instance, after producing a mixture of such products of different molecular weights by hydrolyzing a dialkoxy-silane with less than 1.2 molecular equivalents of water, the mixture may be fractionally distilled to isolate the product having the desired molecular weight. The products of lower molecular weight may be treated with a minor amount of water and again be partially hydrolyzed to form a further amount of the desired product. Usually, such products of undesirably low molecular weight (which products are, of course, the lower-boiling products) are admixed with a fresh quantity of the dialkoxy-silane starting material and the mixture is treated with sufficient water to form the desired alkoxy end-blocked siloxane, which is separated. In effect, by thus recycling the products of undesirably low boiling point, the further formation of such products is suppressed.

After separating from a reacted mixture the alkoxy end-blocked product of desired molecular weight, the similar products of higher boiling point and higher molecular weight, and also any cyclic siloxane products, may be heated with an alcohol and a catalyst to form a further quantity of the desired alkoxy end-blocked siloxane.

By operating in such cyclic manner, a single alkoxy end-blocked siloxane, or, if desired, a group of alkoxy end-blocked siloxanes distilling within a desired temperature range, may be produced as the ultimate product.

The following examples describe certain ways in which the principle of the invention has been applied, but are not to be construed as limiting its scope:

Example 1

A mixture of 2.22 kilograms (15 moles) of dimethyl-diethoxy-silane, 270 grams (15 moles) of water and 270 cubic centimeters of absolute ethyl alcohol was heated to boiling under reflux for a period of 63 hours. During this period the temperature of the boiling mixture gradually decreased from 90° to 81.7° C. Anhydrous alcohol was then distilled from the mixture until the boiling temperature of the residue had increased to 100° C. There was obtained 1400.5 grams of distillate, leaving 1303 grams of material as residue. The alcoholic distillate was diluted with five volumes of water, whereupon 87 grams of a water-insoluble oil separated. Upon cooling this oil, 14 grams of the cyclic dimethyl siloxane trimer crystallized. The remaining 73 grams of oil was added to the residue from the distillation and the resultant mixture was fractionally distilled to obtain the following fractions:

TABLE II

| Fraction No. | Distillation | | Weight in gms. | Viscosity in centistokes at 25° C. | Per cent $C_2H_5O$-content |
|---|---|---|---|---|---|
| | Temp., °C. | Pressure, mm. | | | |
| 1 | 166–178 | 751 | 167.8 | 1.95 | 5.18 |
| 2 | 95 | 28 | 229.7 | 1.35 | 33.0 |
| 3 | 120–121 | 28 | 108.7 | 1.8 | 23.8 |
| 4 | 145 | 28 | 71.5 | 2.34 | 20.0 |
| 5 | 122–124.5 | 2 | 52.2 | 2.96 | 16.8 |
| 6 | 117–200 | .2 | 119.5 | 6.52 | 10.1 |
| Residue | | | 423.0 | 16.5 | 5.9 | siloxane tetramer and the cyclic dimethyl siloxane pentamer. Table III gives the distilling temperatures and the relative yields of the purified products. The table gives the temperature and pressure at which each product distilled, the weight of each product, and the relative silicon contents of the products in terms of atomic weights of silicon. For convenience, the product obtained in least amount is indicated as containing one atomic weight of silicon and the amounts of silicon chemically combined in the other products are expressed proportionately. When thus expressed, the silicon contents indicate the relative, but not the absolute, yields of the several purified products. True yields cannot be given because considerable amounts of the products remained in intermediate fractions. It is believed that the true yields of the individual products would correspond approximately to the relative yields in which they were recovered in purified form.

TABLE III

| Product | Distilled at— | | Weight in gms. | Relative Si contents as atomic wts. of Si |
|---|---|---|---|---|
| | Temp., °C. | Pressure, mm. | | |
| $C_2H_5O[Si(CH_3)_2O]_2C_2H_5$ | 160 | 743 | 814 | 4.32 |
| $[Si(CH_3)_2O]_4$ | 73 | 20 | 269 | 2.14 |
| $C_2H_5O[Si(CH_3)_2O]_3C_2H_5$ | 95 | 20 | 975 | 5.87 |
| $[Si(CH_3)_2O]_5$ | 100 | 20 | 126 | 1 |
| $C_2H_5O[Si(CH_3)_2O]_4C_2H_5$ | 123 | 20 | 1,037 | 6.58 |
| $C_2H_5O[Si(CH_3)_2O]_5C_2H_5$ | 146 | 20 | 900 | 5.97 |
| $C_2H_5O[Si(CH_3)_2O]_6C_2H_5$ | 91 | 0.4 | 813 | 5.54 |
| $C_2H_5O[Si(CH_3)_2O]_7C_2H_5$ | 106 | .4 | 651 | 4.40 |
| $C_2H_5O[Si(CH_3)_2O]_8C_2H_5$ | 121 | .4 | 366 | 2.59 |

Example 2

In each of three experiments, a solution of 21.8 grams (0.544 mole) of sodium hydroxide in 733 grams (40.7 moles) of water was added with stirring to 8051 grams (54.4 moles) of dimethyl-diethoxy-silane over a period of 2 hours. During the addition, the mixture heated spontaneously to about 70° C. The mixture was then heated to boiling under reflux for one hour after which alcohol was distilled therefrom until the boiling temperature had risen to 100° C. Carbon dioxide was passed into the residual mixture for a period of 1.5 hours, whereby the alkali was neutralized and sodium carbonate precipitated. The precipitate was removed by filtration. The mixtures thus obtained in the three experiments were combined and the resultant mixture was fractionally distilled. The distillate was collected as successive two-liter portions until the distilling temperature has increased to 150° C. at 1 millimeter absolute pressure. The residue was a liquid of 7.4 centistokes viscosity at 25° C. It corresponded in weight to 28.2 per cent of the mixture subjected to the distillation. Each two-liter portion of the distillate was itself fractionally distilled and the fractions of the same boiling temperature collected as distillates in the several distillations were combined and again fractionated. A series of individual ethoxy end-blocked dimethyl siloxanes, containing from 2 to 8 silicon atoms in the molecule, were thus isolated. During fractional distillation of the products, there were also separated minor amounts of the cyclic dimethyl

Example 3

The ethoxy end-blocked siloxanes obtained as individual compounds in Example 2, and also corresponding compounds containing, respectively, from 9 to 11 silicon atoms in the molecule, but obtained in other similar experiments, were studied to determine their physical properties. All of the products were clear, colorless liquids. The products containing from 2 to 8 silicon atoms in the molecule remained liquid when cooled to −75° C. Table IV identifies each product and gives the boiling point at each pressure indicated, the viscosity in centistokes at 25° C. and the density and refractive index, each at 20° C.

TABLE IV

| Compound | Boiling point | | Viscosity, cks. | Density | Refractive index $n_D^{20}$ |
|---|---|---|---|---|---|
| | Temp., °C. | Press. | | | |
| $C_2H_5O[Si(CH_3)_2O]_2C_2H_5$ | 161 / 160 / 64.5 | 760 / 743 / 20 | 0.97 | 0.879 | 1.3880 |
| $C_2H_5O[Si(CH_3)_2O]_3C_2H_5$ | 196 / 133 / 95 | 760 / 100 / 20 | 1.35 | .902 | 1.3922 |
| $C_2H_5O[Si(CH_3)_2O]_4C_2H_5$ | 227 / 160 / 123 / 55 | 760 / 91 / 20 / 0.4–0.5 | 1.78 | .916 | 1.3950 |
| $C_2H_5O[Si(CH_3)_2O]_5C_2H_5$ | 253 / 146 / 72 | 760 / 20 / 0.4–0.5 | 2.24 | .920 | 1.3965 |
| $C_2H_5O[Si(CH_3)_2O]_6C_2H_5$ | 274 / 91 | 760 / 0.4–0.5 | 2.75 | .932 | 1.3980 |
| $C_2H_5O[Si(CH_3)_2O]_7C_2H_5$ | 295 / 107 | 760 / 0.4–0.5 | 3.28 | .936 | 1.3990 |
| $C_2H_5O[Si(CH_3)_2O]_8C_2H_5$ | 315 / 121 | 760 / 0.4–0.5 | 3.86 | .941 | 1.3997 |
| $C_2H_5O[Si(CH_3)_2O]_9C_2H_5$ | 131 | 0.2–0.4 | 4.50 | .944 | 1.4002 |
| $C_2H_5O[Si(CH_3)_2O]_{10}C_2H_5$ | 147 | 0.2–0.4 | 5.17 | .947 | 1.4009 |
| $C_2H_5O[Si(CH_3)_2O]_{11}C_2H_5$ | 157–158 | 0.2–0.4 | 5.89 | .950 | 1.4012 |

In the above table, the boiling points given at 760 millimeters pressure are calculated values, but the boiling points at lower pressures were measured.

Example 4

In addition to the individual products described in Table IV, there have been separated, from mixtures prepared as in Example 2, a series of higher-boiling ethoxy end-blocked dimethyl-siloxanes having an average of from 12 to 80 silicon atoms in the molecule. These higher-boiling products were obtained as residues after distilling lower-boiling compounds therefrom and, accordingly, are mixtures of ethoxy end-blocked dimethyl siloxanes, rather than individual compounds. Table V describes three such products and states the per cent ethoxy- and hydroxyl-contents of each, i. e. it gives the per cent by weight of $C_2H_5O-$ and $-OH$ radicals in each product. The table also gives the average number of silicon atoms in the molecule of each product and the viscosity of each product in centistokes at 25° C.

TABLE V

| Product No. | Ethoxy-content, per cent | Hydroxyl content, per cent | Ave. No. of Si atoms per molecule | Viscosity, centistokes |
|---|---|---|---|---|
| 1 | 3.30 | 0.06 | 34.2 | 37.4 |
| 2 | 1.79 | .11 | 58.6 | 82.0 |
| 3 | 1.13 | .15 | 79.6 | 156.0 |

Example 5

The following series of experiments was carried out for purposes of studying the effect of changes in the proportion of water used in partially hydrolyzed dimethyl-diethoxy silane on the viscosity of the mixture of hydrolysis products obtained. A solution of 21.8 grams (0.544 mole) of sodium hydroxide in 882 grams (49 moles) of water was added with stirring over a period of several hours to 8051 grams (54.4 moles) of dimethyl-diethoxy silane. During the addition, the mixture heated spontaneously. When the reaction was nearly complete, as indicated by a temperature drop, alcohol was distilled from the mixture until the latter had been heated to 125° C. There were obtained 4416 grams of distillate and 4451 grams of undistilled residue. A 459 gram sample of the residue was treated with carbon dioxide to convert the sodium hydroxide to sodium carbonate which was removed by filtration. The viscosity of the filtrate was determined. The 3972 grams of residue remaining after withdrawal of said 459 gram sample was again heated to 125° C. and 17.5 grams (0.972 mole) of water was added with stirring over a period of 85 minutes. Heating at 125° C. was continued for 10 minutes after which a 439 gram sample was withdrawn, treated with carbon dioxide, filtered, and the viscosity of the filtrate taken. Such operations of treating with water the material which remained after withdrawal of a sample for viscosity measurement, heating at 125° C. to distill alcohol from the mixture as formed and again withdrawing a sample of the residue for viscosity measurement, were repeated a number of times. The following table describes the results which were obtained. In the table the total amount of water added prior to withdrawal of a sample of material for a viscosity measurement is expressed in terms of gram molecular equivalents of water per gram atomic weight of silicon in the material under treatment. The table gives the weight and the viscosity of each sample thus withdrawn.

TABLE VI

| Run No. | $H_2O$ gram moles per gram atom of Si | Weight of sample, gms. | Viscosity centistokes at 25° C. |
|---|---|---|---|
| 1 | 0.9 | 459 | 3.34 |
| 2 | .921 | 439 | 4.29 |
| 3 | .9427 | 380 | 5.55 |
| 4 | .959 | 384 | 7.13 |
| 5 | .982 | 399 | 10.40 |
| 6 | 1.006 | 394 | 16.85 |
| 7 | 1.03 | 328 | 35.7 |
| 8 | 1.05 | 336 | 72.5 |
| 9 | 1.072 | 847 | 148.0 |

Example 6

Dimethyl-diethoxy silane was hydrolyzed with a limited amount of water to obtain a mixture of ethoxy end-blocked dimethyl siloxanes having a viscosity of 4.9 centistokes at 25° C. The product was further hydrolyzed in stages with minor amounts of water, samples of the material being withdrawn between the successive hydrolyses for purpose of viscosity measurements. The procedure in carrying out this series of experiments was similar to that described in Example 5. Table VII indicates the proportion of water (as gram moles of water per gram atomic weight of silicon in the material under treatment) added to the initial partially hydrolyzed material having the viscosity of 4.9 centistokes prior to withdrawal of each sample of product for viscosity measurement. The table also gives the weight of each sample of hydrolyzed material withdrawn for viscosity measurement and the viscosity of such sample in centistokes at 25° C.

TABLE VII

| Run No. | $H_2O$ moles per gram atom of Si | Weight of sample, gms. | Viscosity, centistokes |
|---|---|---|---|
| 1 | 0.05 | 42 | 14.5 |
| 2 | .07 | 436 | 14.8 |
| 3 | .092 | 430 | 24.8 |
| 4 | .114 | 315 | 54.2 |
| 5 | .134 | 227 | 126.5 |

Example 7

Samples of a number of the products upon which viscosity measurements are given in Examples 5 and 6 were tested to determine their index of refraction and their per cent by weight ethoxy content. Each such product was heated under vacuum to distill lower-boiling ingredients therefrom. In each experiment, the material collected as distillate, and also that remaining as the still residue, were examined to determine the per cent ethoxy content thereof, the index of the fraction, $n_D^{20}$, and the viscosity in centistokes at 25° C. Also, the specific gravity at 20° C. of each oil obtained as a still residue was determined. Under the caption "Original oil," Table VIII identifies each material subjected to the distillation by giving its viscosity, its index of refraction, and its per cent ethoxy content. The table states the pressure under which each distillation was carried out, the temperature to which the residue was heated during distillation, and the amount of distillate as per cent by weight of the material subjected to the distillation. It gives the per cent ethoxy content, the index of refraction, and the viscosity both of the distillate and of the residue. It also gives the specific gravity and the average number of silicon atoms per molecule for each oil obtained as a still residue.

hol in the proportions given in Table X. The mixture was heated to boiling under reflux for a period of from 4.5 to 5 hours, after which it was

TABLE VIII

| Run No. | Original oil | | | Distilling conditions | | Distillate | | | | Residue oil | | | | |
|---|---|---|---|---|---|---|---|---|---|---|---|---|---|---|
| | Viscosity, cks. | Ethoxy content, per cent | $n_D^{30}$ | Abs. press., mm. | Final temp., °C. | Vol. per cent of orig. oil | Viscosity, cks. | Ethoxy content, per cent | $n_D^{30}$ | Viscosity, cks. | Specific gravity | Ethoxy content, per cent | $n_D^{30}$ | Ave. No. of Si atoms per mole |
| 1 | 3.34 | 17.0 | 1.3975 | 20 | 150 | 21.8 | ----- | 31.1 | 1.3899 | 5.15 | 0.9444 | 12.06 | 1.3996 | 9.1 |
| 2 | 4.29 | 13.8 | 1.3989 | 20 | 155 | 18.1 | 1.42 | 27.1 | 1.3902 | 6.30 | .9476 | 10.76 | 1.4003 | 10.3 |
| 3 | 5.55 | 11.4 | 1.4001 | 20 | 165 | 15.7 | 1.53 | 23.0 | 1.3915 | 7.71 | .9518 | 8.95 | 1.4010 | 12.6 |
| 4 | 7.13 | 9.39 | 1.4008 | 20 | 185 | 15.8 | 1.80 | 16.9 | 1.3940 | 9.9 | .9554 | 7.83 | 1.4015 | 14.5 |
| 5 | 10.4 | 7.87 | 1.4017 | 16 | 200 | 13.3 | 2.05 | 12.03 | 1.3941 | 13.5 | .9597 | 6.13 | 1.4024 | 18.9 |
| 6 | 14.8 | 5.53 | 1.4023 | 1 | 200 | 19.5 | 2.65 | 11.0 | 1.3963 | 21.7 | .9652 | 4.14 | 1.4032 | 28.4 |
| 7 | 16.9 | 4.77 | 1.4028 | 1 | 200 | 16.7 | 2.64 | 8.93 | 1.3964 | 24.1 | .9655 | 3.55 | 1.4035 | 33.3 |
| 8 | 24.8 | 3.57 | 1.4034 | 1 | 200 | 14.0 | 2.74 | 6.53 | 1.3964 | 34.0 | .9676 | 3.07 | 1.4039 | 38.6 |
| 9 | 35.7 | 2.57 | 1.4037 | 1 | 200 | 11.9 | 2.85 | 3.55 | 1.3969 | 48.0 | .9695 | 2.30 | 1.4046 | 52 |
| 10 | 54.2 | 1.68 | 1.4044 | 1 | 200 | 10.7 | 2.97 | 2.29 | 1.3975 | 76.8 | .9718 | 1.48 | 1.4046 | 81 |
| 11 | 72.5 | 1.40 | 1.4043 | 1 | 200 | 11.7 | 2.85 | 1.60 | 1.3976 | 102.0 | .9720 | 1.06 | 1.4049 | 114 |
| 12 | 126.5 | .84 | 1.4043 | 1 | 200 | 11.2 | 2.95 | .67 | 1.3975 | 184.0 | ----- | .60 | 1.4049 | 202 |
| 13 | 148.0 | .77 | 1.4045 | 1 | 200 | 11.5 | 2.94 | 1.45 | 1.3971 | 290.0 | .9736 | .42 | 1.4050 | 288 |

Example 8

The purpose of this example is to compare different procedures for removing an alkali from alkoxy end-blocked siloxanes. Various samples of ethoxy end-blocked dimethyl siloxanes which had been prepared by the partial hydrolysis of dimethyl-diethoxy-silane in the presence of a minor amount of sodium hydroxide as a catalyst and which retained the latter were used as starting materials. Certain of the starting materials were washed with a dilute aqueous hydrochloric acid solution to remove the alkali. The alkali was removed from others by diluting them with benzene, treating with carbon dioxide to form and precipitate sodium carbonate and removing the latter by filtration. The viscosity of the material under treatment was determined both before and after each treatment with hydrochloric acid or carbon dioxide to remove the alkali. Table 9 states the kind of treatment employed in each experiment to remove the alkali and gives the viscosity of the siloxane product, both before and after the treatment.

TABLE IX

| Run No. | Treatment | Viscosity | |
|---|---|---|---|
| | | Before treatment | After treatment |
| 1 | HCl | 529 | 2,935 |
| 2 | HCl | 540 | 1,071 |
| 3 | HCl | 562 | 1,385 |
| 4 | CO₂ | 468 | 477 |
| 5 | CO₂ | 525 | 532 |
| 6 | CO₂ | 463 | 914 |

Although both procedures for removing the alkali permit (or cause) a change in the viscosity of the alkoxy end-blocked siloxanes under treatment, the carbon dioxide treatment causes the lesser change. It should be mentioned that in Runs 4–6, the viscosities are those of the solutions of the ethoxy end-blocked siloxanes and benzene.

Example 9

In each of three experiments, a dimethyl siloxane, which had been prepared by hydrolyzing dimethyl-diethoxy-silane and which had a viscosity of 495 centistokes at 25° C. and an ethoxy content of 0.28 per cent by weight, was treated with sodium hydroxide and absolute ethyl alcohol in the proportions given in Table X. The mixture was heated to boiling under reflux for a period of from 4.5 to 5 hours, after which it was cooled, treated with carbon dioxide to precipitate the alkali as sodium carbonate and the latter was removed by filtration. The viscosity of the filtrate was measured. The table states the proportions of alcohol and sodium hydroxide employed in each starting mixture, in terms of the gram molecular weights of each such ingredient per gram atomic weight of silicon in the dimethyl siloxane under treatment. It also gives the per cent ethoxy content and the viscosity, in centistokes at 25° C., of each product.

TABLE X

| | Starting materials | | Product | |
|---|---|---|---|---|
| Run No. | Alcohol gm. moles per gm. atom of Si | NaOH gm. moles per gm. atom of Si | Ethoxy content, per cent | Viscosity, cks. |
| 1 | 0.04 | 0.001 | 0.85 | 129 |
| 2 | .10 | .001 | 1.32 | 86 |
| 3 | 1.0 | .010 | 3.32 | 34 |

By procedure similar to that described in Example 2, we have, in separate experiments, hydrolyzed lauryl-methyl-diethoxy-silane and phenyl-methyl-diethoxy-silane with equimolecular amounts of water to obtain corresponding ethoxy end-blocked siloxanes, i. e. mixtures of ethoxy end-blocked lauryl-methyl-siloxanes and ethoxy end-blocked phenyl-methyl-siloxanes, respectively. Both products were liquid at room temperature.

Other alkoxy end-blocked siloxanes may be prepared by the method herein disclosed. For instance, the method may be applied in preparing dimethoxy-lauryl-methyl-siloxanes from lauryl-methyl-dimethoxy - silane; dimethoxy - phenyl-methyl-siloxanes from phenyl-methyl-dimethoxy-silane; dimethoxy-dimethyl siloxanes from dimethyl-dimethoxy-silane; dimethoxy-diethyl-siloxanes from diethyl-dimethoxy-silane; diethoxy-diethyl-siloxanes from diethyl-diethoxy-silane; diethoxy-dipropyl-siloxanes from dipropyl-diethoxy-silane; and in preparing dipropoxy-siloxanes from dibutyl-dipropoxy-silane, etc. For purpose of clarity, it may be mentioned that a dipropoxy-dibutyl-siloxane possesses the formula:

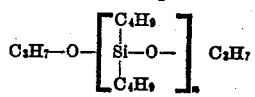

wherein $n$ is an integer greater than 1 and that the other products just mentioned have corresponding molecular structures.

Other modes of applying the principle of the invention may be employed instead of those explained, change being made as regards the method or compounds herein disclosed, provided the steps or compounds stated by any of the following claims, or the equivalent of such stated steps or compounds, be employed.

We therefore particularly point out and distinctly claim as our invention:

1. A siloxane polymer composed for the most part of at least one compound having the general formula:

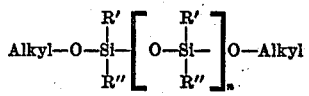

wherein R' and R" each represents a monovalent hydrocarbon radical and $n$ is an integer.

2. A siloxane polymer composed for the most part of at least one compound having the general formula:

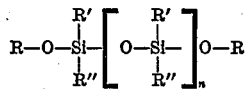

wherein R, R', and R" represent lower alkyl radicals and $n$ is an integer.

3. A mixture of organo-siloxanes consisting for the most part of compounds having the general formula:

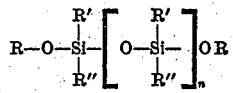

wherein R, R', and R" represent lower alkyl radicals and $n$ is an integer greater than 50.

4. A siloxane polymer composed for the most part of at least one compound having the general formula:

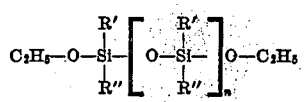

wherein R' and R" represent lower alkyl radicals and $n$ is an integer.

5. A siloxane polymer composed for the most part of at least one compound having the general formula:

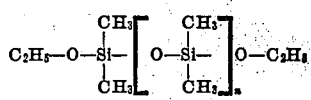

wherein $n$ is an integer.

6. A compound having the general formula:

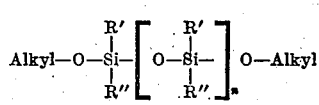

wherein R' and R" represent alkyl radicals and $n$ is an integer.

7. A compound having the general formula:

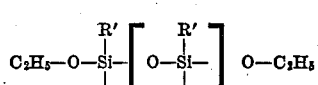

wherein R' and R" represent hydrocarbon radicals and $n$ is an integer.

8. A compound having the general formula:

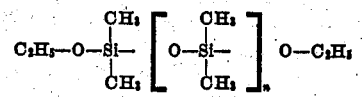

wherein $n$ is an integer of from 1 to 10.

9. A compound having the general formula:

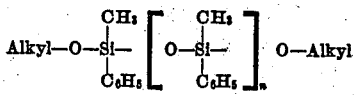

wherein $n$ is an integer.

10. A compound having the general formula:

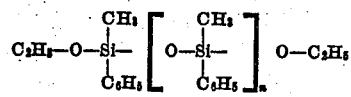

wherein $n$ is an integer.

11. In a method of making alkoxy end-blocked siloxanes, the step of reacting a dialkoxy-silane having the general formula:

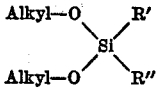

wherein R' and R" represent monovalent hydrocarbon radicals, with from 0.5 to 1.2 molecular equivalents of water under neutral to slightly alkaline conditions.

12. In a method of making alkoxy end-blocked siloxanes, the step of reacting a dialkoxy-silane having the general formula:

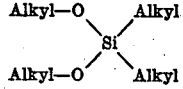

with from 0.5 to 1.2 molecular equivalents of water under neutral to slightly alkaline conditions.

13. In a method of making alkoxy end-blocked siloxanes, the steps of reacting a dialkoxy-silane, having the general formula:

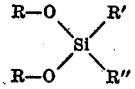

wherein R, R', and R" represent lower alkyl radicals, with from 0.5 to 1.2 molecular equivalents of water in the presence of a minor amount of an alkali as catalyst, treating the residue with carbon dioxide to precipitate the alkali as a carbonate and removing the latter.

14. In a method of making alkoxy end-blocked siloxanes, the steps of reacting a dialkoxy-silane, having the general formula:

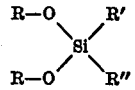

wherein R, R', and R" represent lower alkyl radicals, with from 0.5 to 1.2 molecular equivalents of water under neutral to slightly alkaline conditions, distilling from the mixture the alcohol formed in the reaction and fractionally distilling the residue to separate an alkoxy end-blocked siloxane product from similar compounds of other distilling temperatures.

15. In a method, as described in claim 14, the step of reacting alkoxy end-blocked siloxanes with less than a molecular equivalent of water to form other alkoxy end-blocked siloxanes of higher distilling temperatures.

16. In a method, as described in claim 14, the steps of treating the residual higher boiling alkoxy end-blocked siloxanes, from the distillation of the product, with an alcohol and a minor amount of an alkali and heating the mixture to cause formation of a further amount of said product.

MELVIN J. HUNTER.
HERBERT J. FLETCHER.
CHESTER C. CURRIE.

REFERENCES CITED

The following references are of record in the file of this patent:

FOREIGN PATENTS

| Number | Country | Date |
|---|---|---|
| 113,708 | Australian | Sept. 4, 1941 |

OTHER REFERENCES

Beilstein, "Handbuch der Org. Chem.," 4th Ed., vol. IV, page 629.

Kipping et al., "Jour. Chem. Soc." (London), vol. 105, pgs. 493–5 (1914).

Pink et al., "Jour. Chem. Soc." (London), vol. 123, pgs. 2835–37 (1923).

Andrianov, J. Gen. Chem. (U. S. S. R.), vol. 8, pgs. 1255–63 (1938).

Hyde, "Jour. Am. Chem. Soc.," vol. 63, pgs. 1194–6 (1941).

Post, "Jour. Org. Chem.," vol. 5, pgs. 575–6 (1940).